United States Patent [19]
Houben et al.

[11] Patent Number: 5,933,969
[45] Date of Patent: Aug. 10, 1999

[54] CIRCULAR SAW

[75] Inventors: Jan Peter Houben, Breda; Jan Van Rijen, Prinsenbeek, both of Netherlands

[73] Assignee: Skil Europe B.V., Netherlands

[21] Appl. No.: 08/719,573

[22] Filed: Sep. 25, 1996

[30] Foreign Application Priority Data

Sep. 26, 1995 [NL] Netherlands .............................. 1001299

[51] Int. Cl.⁶ ................................................. B27B 5/29
[52] U.S. Cl. ................................................ 30/390; 30/388
[58] Field of Search .............................. 30/390, 388, 514, 30/505

[56] References Cited

U.S. PATENT DOCUMENTS

| | | | |
|---|---|---|---|
| 5,010,651 | 4/1991 | Techter et al. | 30/376 |
| 5,052,497 | 10/1991 | Houben et al. | 173/109 |
| 5,113,951 | 5/1992 | Houben et al. | 408/58 |
| 5,398,417 | 3/1995 | Quirijnen et al. | 30/394 |

FOREIGN PATENT DOCUMENTS

| | | |
|---|---|---|
| 177469A1 | 4/1986 | European Pat. Off. . |
| 2251416 | 6/1975 | France . |
| 743056 | 12/1943 | Germany . |
| 3505041A1 | 8/1986 | Germany . |
| 3536464A1 | 4/1987 | Germany . |

*Primary Examiner*—M. Rachuba
*Attorney, Agent, or Firm*—Jones, Day, Reavis & Pogue

[57] ABSTRACT

The invention relates to an electric hand tool comprising a housing manufactured from a first material, for instance plastic, a first shaft which is mounted in at least a first bearing and a second shaft which extends parallel to the first shaft and is coupled to the first shaft by means of a transmission and which is mounted in at least a second bearing, wherein both bearings are intersected by a plane extending perpendicularly of the shafts, wherein a plate manufactured from a second material that is stronger than the first material is arranged extending perpendicularly of the shafts, which plate fixes the first and second bearing in at least partially confining manner at least in radial direction.

15 Claims, 6 Drawing Sheets

CIRCULAR SAW

The invention relates to an electric hand tool comprising a housing manufactured from a first material, for instance plastic, a first shaft which is mounted in at least a first bearing and a second shaft which extends parallel to the first shaft and is coupled to the first shaft by means of a transmission and which is mounted in at least a second bearing, wherein both bearings are intersected by a plane extending perpendicularly of the shafts.

Such an electric hand tool is generally known.

In the known electric hand-tool use is usually made of plastic housings. When the bearings are embedded or enclosed therein without further provision there is the danger of the bearings coming loose due to the comparatively large forces exerted thereon, whereby the shafts are no longer wholly parallel to each other and the transmission no longer operates properly. It is noted herein that heat develops at the bearings due to friction. A higher temperature will therefore usually prevail at the bearing which heats the plastic housing. As a result the housing could become soft when thermoplastic plastics are used, which aggravates the problems. This can result in an increased noise production and reduced power on the output shaft, or jamming of the machine.

Constructions are now also known in the art in which the bearings are accommodated in a housing manufactured from a sturdy material, for instance a metal housing. However this results in a costly construction.

The object of the invention is to provide such a hand tool, wherein the bearings are sufficiently fixed, also when a plastic housing is used.

This object is achieved in that a plate manufactured from a second material that is stronger than the first material is arranged extending perpendicularly of the shafts, which plate confines the first and second bearing.

This invention is based on the fact that, particularly due to the transmission, only radial forces prevail between the shafts. This means that only radial forces between the shafts have to be absorbed.

The invention makes use of this knowledge in attractive manner by providing such a plate.

It will be apparent that the invention is mainly suitable for absorbing radial forces absorbed by the bearings. When a bearing fixed in such a manner must also absorb axial forces, other steps must then be taken for this purpose.

According to a preferred embodiment the invention relates to an electric sawing machine wherein the saw blade shaft is at least mounted in a bearing which is arranged in an extension of the wall of the housing adjacent to the saw blade, and around the extension a strengthening ring is arranged which is manufactured from a material which is stronger than the material from which the housing is manufactured.

As a result of these steps the relevant bearing is as it were locked, whereby it is possible to place the bearing directly into the housing of a sawing machine without connection to further structural components. The ring arranged round the extension containing the bearing ring ensured sufficient sturdiness.

This moreover results in a more attractive assembly because fewer components have to be joined together. It is pointed out here that the housing must of course be divisible at the position of the bearing in order to enable assembly and disassembly of the bearing.

According to yet another preferred embodiment, wherein the tool is a circular sawing machine, the circular sawing machine is provided with at least one fixed guard cover, which fixed guard cover comprises an inner wall extending parallel to the saw blade, a jacket wall and an outer wall extending parallel to the saw blade, wherein at least the inner wall is formed integrally with the housing.

This results in an attractive and cost-saving manufacture because the number of components during assembly is reduced, while moreover a guard cover which is in itself difficult to manufacture is formed at least partially by a component which is formed integrally with the housing and which is preferably manufactured from plastic. The use of plastic moreover offers the option of providing the relevant component with a colour through and through, possibly even with different colors.

Other attractive embodiments are stated in the subclaims.

The invention will be elucidated hereinbelow with reference to the annexed drawings, in which.

Figure 1:
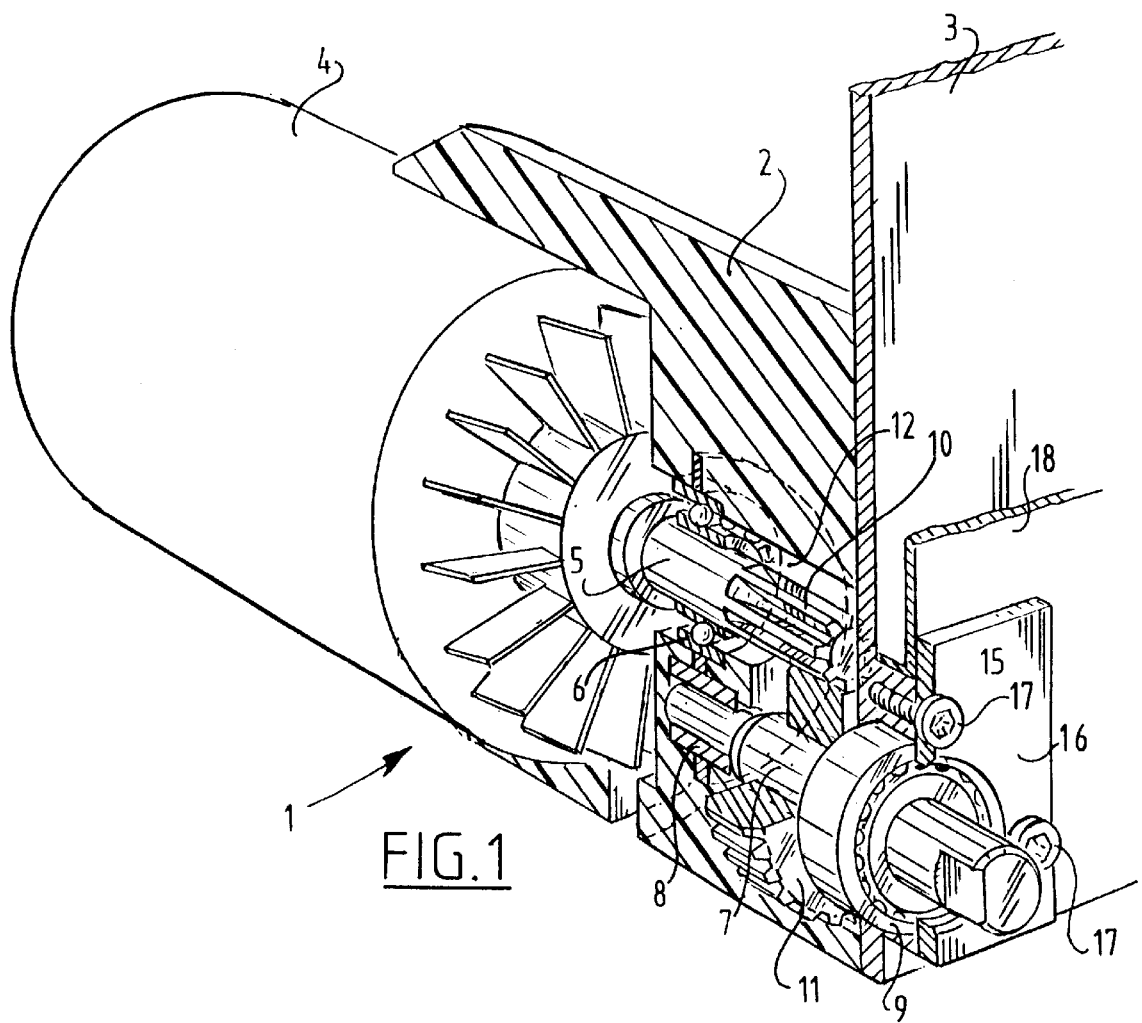
FIG. 1 shows a partly broken away perspective view of a detail of an electric hand tool in which are accommodated a motor and a shaft driving a tool accessory.

Shown in FIG. 1 is a part of a sawing machine 1 which comprises a housing 2 and a guard cover 19 of the saw blade (not shown in the drawing). Arranged in housing 2 is an electric motor 4 which is provided with an output shaft 5 which is mounted in housing 2 in a bearing 6 suitable for absorbing radial forces. A second shaft 7 is further mounted in housing 2 by means of a bearing 8 and a bearing 9. The output motor shaft 5 is provided on its end with a toothing 10, while a tooth wheel 11 is arranged on the second shaft 7. Both tooth wheels 10,11 are in mutual engagement, thus forming a transmission.

Figure 2A:
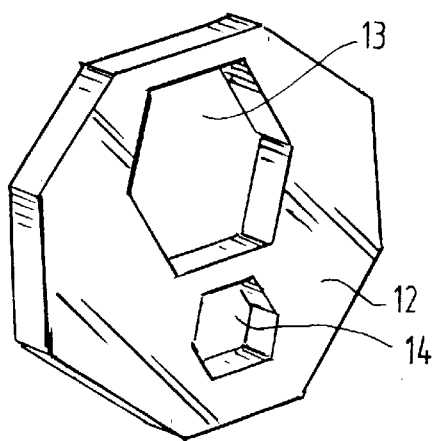
FIG. 2A is a perspective view of a variant of the plate shown in FIG. 1.

In order to absorb the radial forces between the two shafts a confining or locking plate 12 is arranged in the motor housing. This confining plate 12 is shown in FIG. 2A. The confining plate 12 serves to absorb radial forces between the two shafts 5,7 and thus between the two bearings 6,8. For this purpose holes 13 respectively 14 are arranged in the confining plate 12. It is pointed out here that the confining plate 12 has no further connection to any structural components inside the sawing machine construction; for its function the confining plate 12 is sufficiently enclosed on all sides by the material of the motor housing.

As shown in FIG. 2A, it is possible to provide the confining plate 12 with a polygonal periphery and polygonal holes.

Figure 2B:
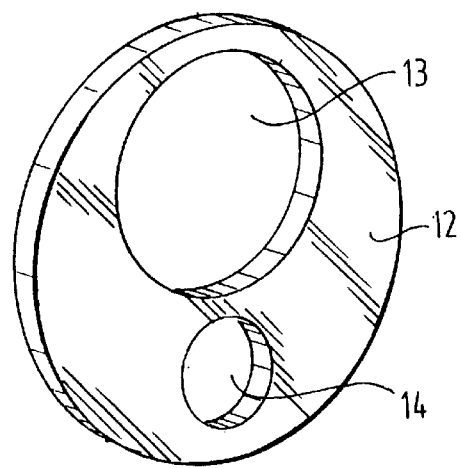
FIG. 2B is a perspective view of a component for use in the construction shown in FIG. 1.

The confining plate 12 shown in FIG. 2B has a round periphery and is provided with round holes.

Polygonal holes are of course only applicable if the periphery of the bearings arranged therein is form-fitting. Both forms can be combined at random.

The locking plate 12 must of course be manufactured from sturdy material, for instance a metal. This provides the possibility of manufacturing the housing of a relatively softer material, for instance a plastic.

It is even possible to combine the function of the locking plate with that of a cooling element. For this purpose the locking plate will have to be connected to the environment via a small heat resistance, for instance by providing the locking plate with ribs or protrusions extending up to the outer wall of the machine. It is also possible to arrange air channels to the locking plate.

Figure 3:
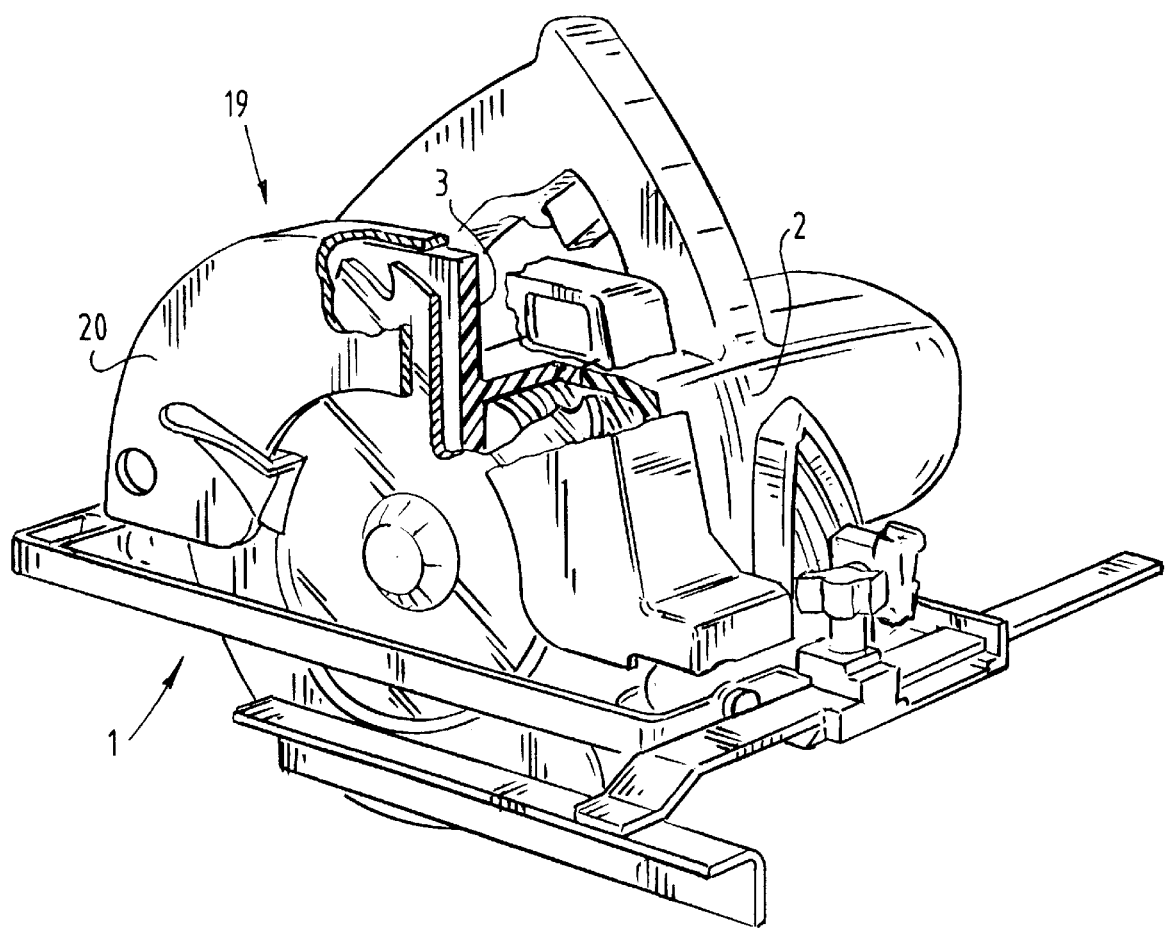
FIG. 3 shows a partly broken away perspective view of a circular sawing machine according to the invention.

FIG. 1 further shows how the bearing 9 of the second shaft is received in an extension 15 formed against 19 (see FIG. 3) the inner wall 3 of a fixed guard cover 19 (see FIG. 3). This bearing is also not further connected to structural components of the circular saw construction. In order to lock bearing 9 in the cavities formed for this purpose in the extension 15 use is made of a closing plate 16 which is fixed onto extension 15 by means of bolts 17 (see FIG. 9).

Figure 9:
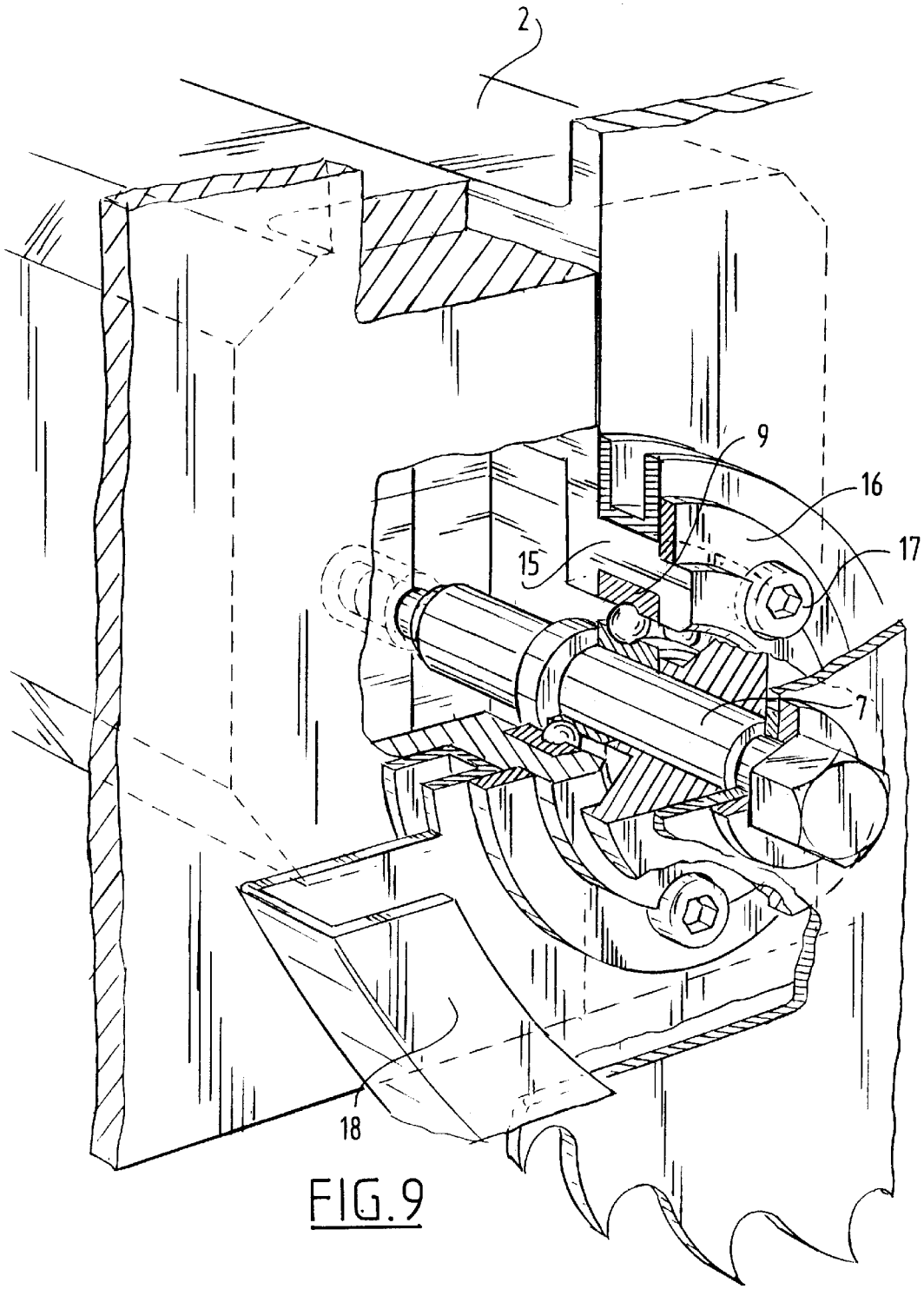
FIG. 9 is a partly broken away perspective detail view of the mounting of the shaft driving the saw blade.

This moreover offers the possibility of allowing the closing plate 16 to protrude outside the extension 15, which makes it possible to mount on the extension 15, and axially lock, a movable guard cover 18 (see FIG. 9).

FIG. 3 shows another embodiment of a circular saw machine according to the invention; the housing 2 of the sawing machine forms one whole, possibly containing various components, with the inner wall 3 of the fixed guard cover 19. The latter is otherwise formed by a component 20, which forms the outer side wall, and the jacket wall 30 of the fixed guard cover 19.

Figure 4:
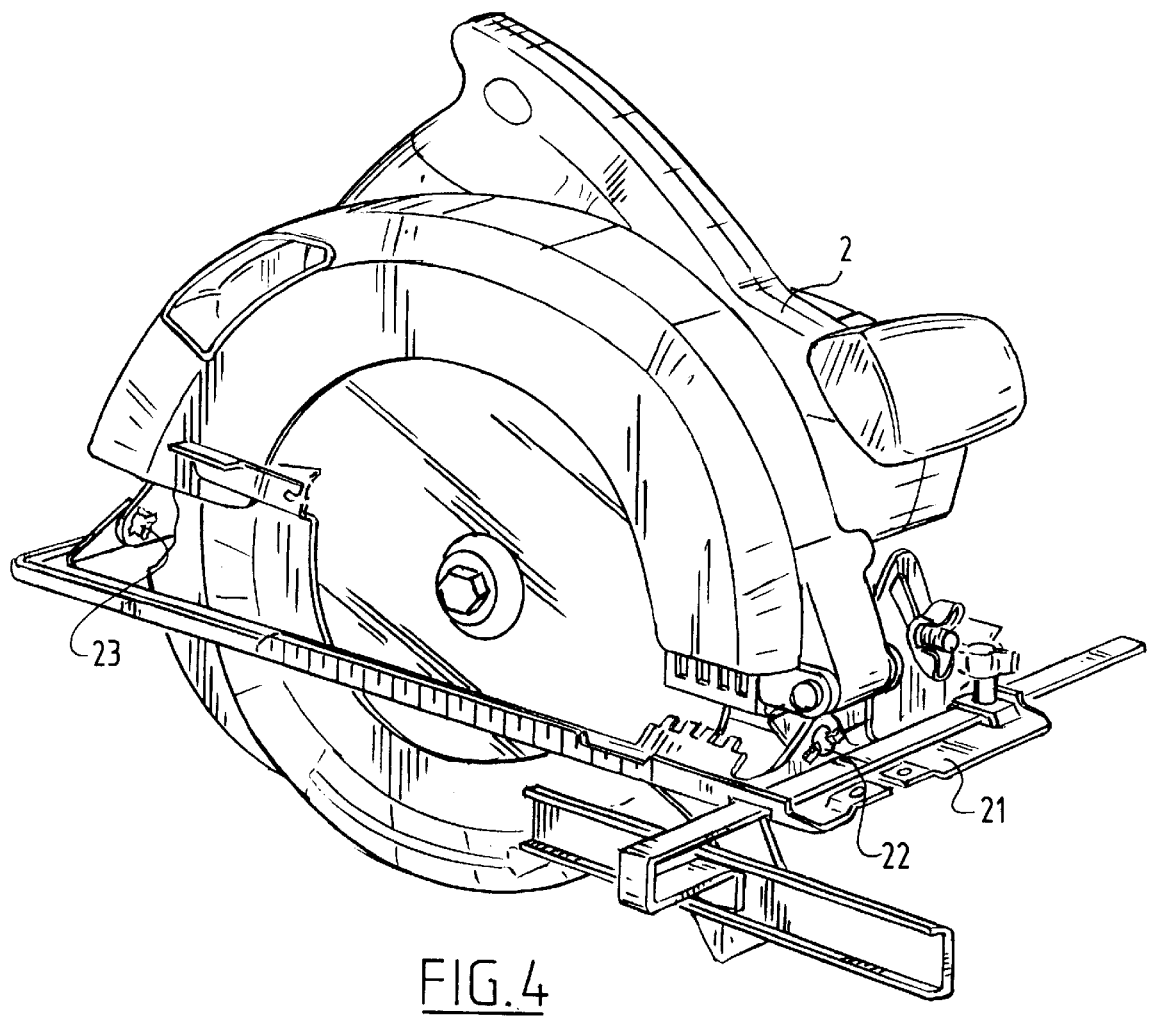
FIG. 4 shows a partly broken away perspective view of another circular sawing machine according to the invention.

FIG. 4 shows yet another embodiment; this embodiment of the circular sawing machine is provided with a footplate 21 which is connected rotatably by means of hinges 22,23 to the housing 2 of the circular sawing machine. The shaft connecting hinges 22 and 23 extends parallel to the saw blade, which enables tilting of sawing machine 2 such that miter-sawing is thereby possible.

Figure 5:
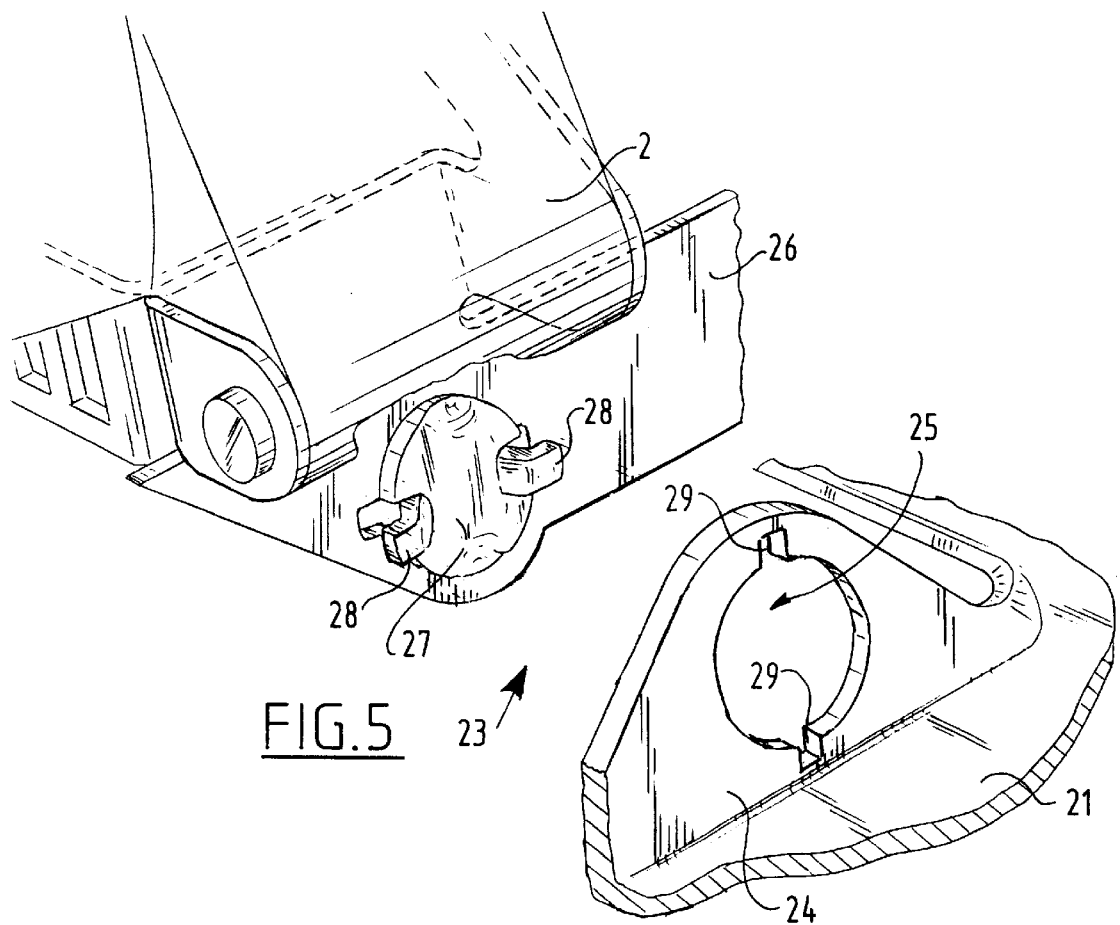
FIG. 5 is a partly broken away perspective detail view of a first hinge for use in the circular sawing machine shown in FIG. 4.
Figure 6:
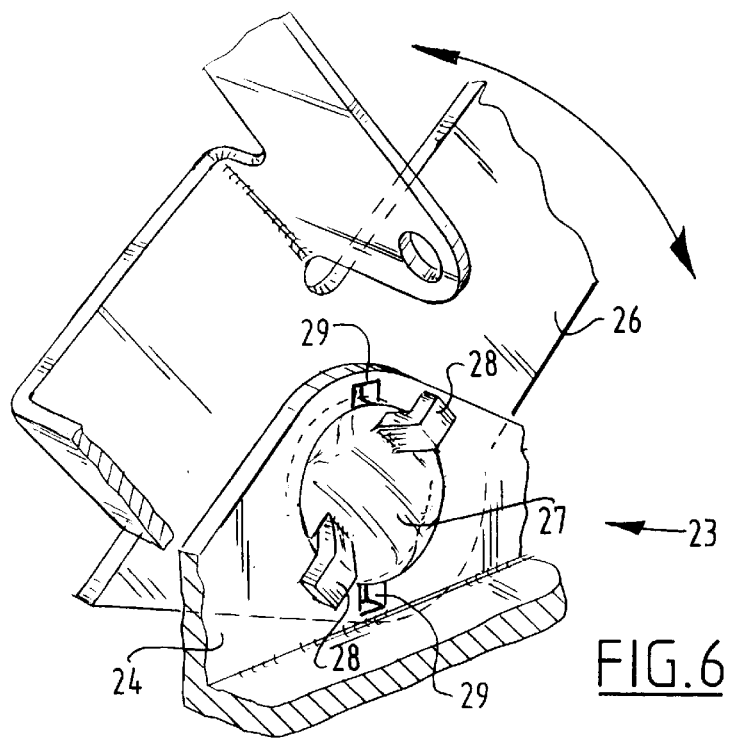
FIG. 6 is a partly broken away perspective detail view of the connected hinge shown in FIG. 5.

Hinges 22,23 are shown in more detail in FIGS. 5 and 6.

The hinge 23 shown in FIG. 5 is thus formed by a bent part 24 of footplate 21 in which a substantially round hole 25 is made. The housing 2 of the circular sawing machine is further connected to a plate 26 extending parallel to the bent part 24 of plate 21, wherein a bulge 27 is arranged in plate 26, for instance by a press. Bulge 27 fits into hole 25, this such that bulge 27 can rotate inside hole 25 and the plate 26 can thus rotate relative to plate part 24.

Thus achieved is the result that the footplate 21 can rotate relative to housing 2. In order to fix plate part 24 on plate 26 a bayonet fitting is arranged in the form of punched-out ears 28 which fit into broadened portions 29 of hole 25 arranged for this purpose. It is otherwise also possible to make use of only a single ear.

The operation of a bayonet fitting is obtained with the thus shown construction. It can be ensured herein that during normal operative positions the bayonet fitting cannot be taken apart. It is also possible however, as in the present embodiment, to embody the other hinge in mirror-image manner, wherein the position of plates 24 and 26 is interchanged. This makes it possible, provided the mutually facing plates 26 are both firmly connected to housing 2, to displace housing 2 axially relative to footplate 21 so that a sufficiently sturdy fixation is obtained.

In order to enable assembly hereof the plates 26 must first be placed in their correct position in relation to plates 24, whereafter housing 2 or optional other components for arranging therebetween must be placed in their position and connected fixedly to plates 26.

FIG. 6 shows the hinge 23 in its assembled situation. This also illustrates the bayonet action of the diverse components.

Figure 7:
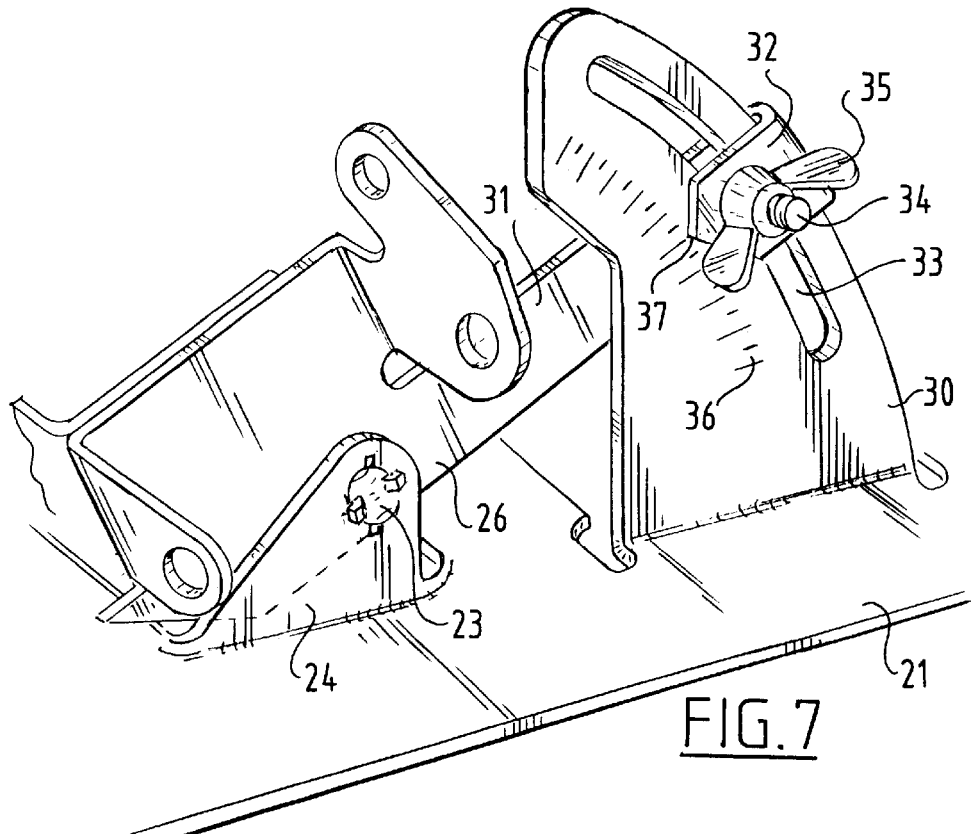
FIG. 7 is a perspective detail view of a part of the circular sawing machine shown in FIG. 4.

The hinge construction is developed further in the construction shown in FIG. 7. The footplate 21 is herein provided with a bent calibration plate 30, while plate 26 is provided with an elongation in the form of an indicator 31. The latter is herein bent round on the outside of calibration plate 30 so that a bent portion 32 is formed. A slot 33 is further arranged in calibration plate 30 while both in indicator 31 and in the bent portion 32 thereof is arranged a hole, not shown in the drawings, through which extends a bolt 34. Bolt 34 is provided with a wing nut 35. The calibration plate 30 is further provided with a calibration 36, while indicator 31 is provided with an arrow tip 37.

Due to the fact that indicator 31 is folded round to a bent portion 32, the friction surface between indicator 31 and calibration plate 30 is doubled. This makes it possible to obtain a better fixation or to make use of materials with less strength.

Figure 8:
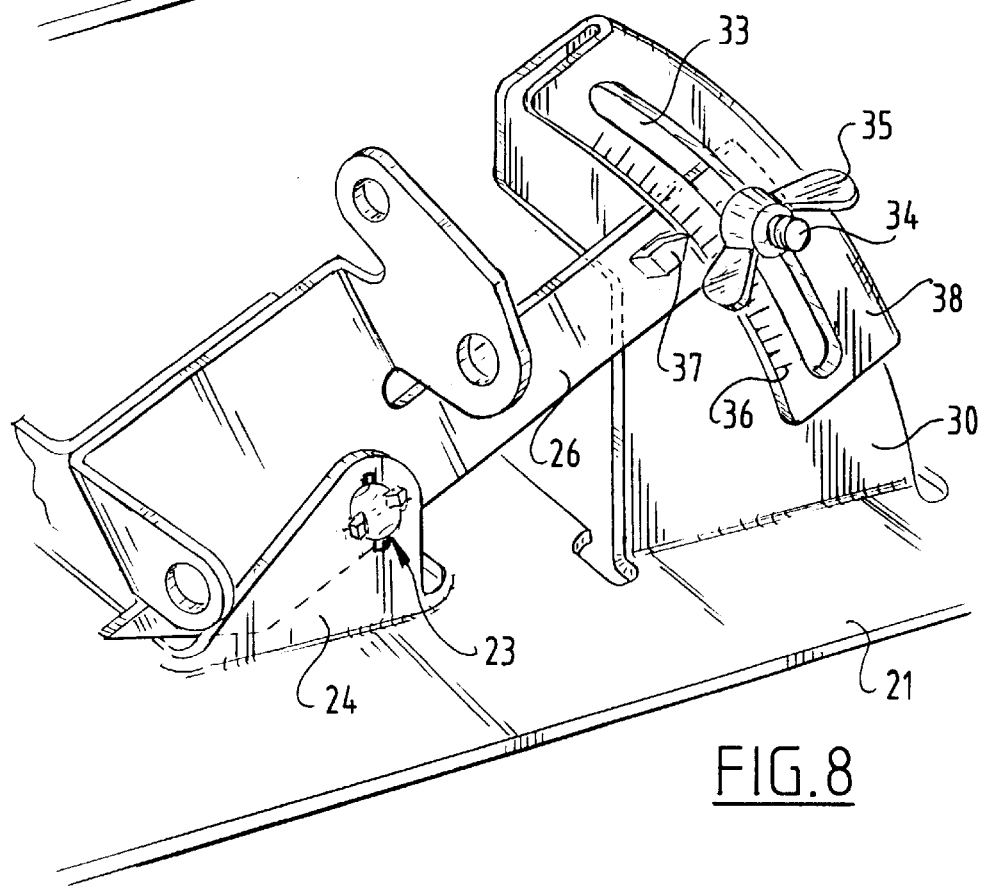
FIG. 8 is a perspective detail view of an alternative embodiment of the construction shown in FIG. 7.

FIG. 8 shows another embodiment, wherein the indicator 31 is not bent round but wherein calibration plate 30 is provided with a bent piece 38. It will be apparent that both calibration plate 30 and the bent portion 38 thereof are provided with a slot 33 and that bolt 34 extends through both these latter components. The operation of this embodiment is otherwise the same as that of the foregoing embodiment.

Finally, FIG. 9 shows by analogy with the embodiment shown in FIG. 1 a slightly different embodiment of the mounting of bearing 9 in the bulge 15. The closing plate 16 here also extends slightly radially relative to bearing 9 so that bearing 9 is also confined in radial direction. The closing plate 16, which in this case takes rather the form of a ring, is here also used to confine the movable guard cover 18.

It will be apparent that changes can be made to the shown embodiments without departing from the invention.

We claim:

1. An electric hand tool comprising a housing manufactured from a first material, a first shaft which is mounted in at least a first bearing, and a second shaft which extends parallel to the first shaft and is coupled to the first shaft by means of a power transmission and which is mounted in at least a second bearing wherein both bearings are intersected by a plane extending perpendicular to the shafts, the tool including a plate manufactured from a second material that is stronger than the first material and arranged to extend perpendicular to the first and second shafts, which plate includes first and second orifices extending through said plate for fixing the first and second bearings in a partially confining manner for absorbing forces primarily in a radial direction.

2. The electric hand tool as claimed in claim 1 wherein the first shaft is formed by the motor shaft and the second shaft is a rotation shaft driving an implement forming part of the tool.

3. The electric hand tool as claimed in claim 2 wherein the hand tool is a circular sawing machine and the implement is a circular saw blade on said rotation shaft which is provided with at least one fixed guard cover, which fixed guard cover comprises an inner wall extending parallel to the circular saw blade, a jacket wall, and an outer wall extending parallel to the circular saw blade and wherein at least the inner wall is formed integrally with the housing.

4. The electric circular sawing machine as claimed in claim 3 wherein the jacket wall and the inner wall of the fixed guard cover are formed integrally together with the housing.

5. The electric circular sawing machine as claimed in claim 3 wherein all walls of the fixed guard cover are formed as an integral unit.

6. The electric sawing machine as claimed in claim 3 wherein the sawing machine comprises a footplate hingedly connected to the housing and wherein the footplate is connected to the housing by at least two hinges and that each hinge comprises a pivot shaft, a first plate extending perpendicularly of the pivot shaft and connected to the footplate, and a second plate extending parallel to the first plate and connected to the housing wherein an orifice is arranged in one of the first and second plates and a bulge is arranged in the other plate wherein the bulge or projection or extends into the orifice and is enclosed by the edges of the orifice.

7. The electric sawing machine as claimed in claim 6 wherein at least one of the hinges is provided with a bayonet fitting.

8. The electric sawing machine as claimed in claim 6 wherein the two hinges are placed in mirror image with each other.

9. The electric sawing machine as claimed in claim 8 wherein the first and socond plates are connected to a component extending at least partially between the plates.

10. The electric sawing machine as claimed in claim 6 further comprising a calibration plate extending perpendicularly of the rotation shaft and having an outer end, an indicator coupled to the housing and extending parallel to and in the vicinity of the calibration plate and a fixation element on said indicator and having an outer end for fixing the indicator relative to the calibration plate.

11. The electric sawing machine as claimed in claim 10 wherein at least one of the calibration plate and the indicator is provided with a portion extending on both sides of the other in order to increase the friction-generating surface between the calibration plate and the indicator at the position of the fixation element.

12. The electric sawing machine as claimed in claim 11 wherein the portion extending on both sides of the other is bent generally U-shaped at the outer end.

13. The electric sawing machine as claimed in claim 3 wherein the circular saw blade rotation shaft is mounted in a bearing arranged in an extension of the wall of the housing adjacent to the circular saw blade, and a strengthening ring arranged around the wall extension that is manufactured from a material that is stronger than the material from which the housing is manufactured.

14. The electric sawing machine as claimed in claim 13 wherein the electric sawing machine is provided with a movable guard cover that is mounted on the wall extension.

15. The electric sawing machine as claimed in claim 14 wherein the movable guard cover is confined by the strengthening ring.

* * * * *

UNITED STATES PATENT AND TRADEMARK OFFICE
CERTIFICATE OF CORRECTION

PATENT NO.   : 5,933,969
DATED        : August 10, 1999
INVENTOR(S)  : Houben et al.

It is certified that error appears in the above-identified patent and that said Letters Patent is hereby corrected as shown below:

Column 5, line 11, delete "or" at the beginning of the line;

Column 5, line 20, "socond" should read --second--; and

Signed and Sealed this

Twenty-sixth Day of September, 2000

Attest:

Q. TODD DICKINSON

Attesting Officer

Director of Patents and Trademarks